United States Patent [19]

Houston

[11] Patent Number: 4,853,630

[45] Date of Patent: Aug. 1, 1989

[54] MAGNETIC POSITION SENSOR HAVING SPACED TOROIDAL MAGNETS IN A STATE OF EQUILIBRIUM

[76] Inventor: John S. Houston, 546 Savoy St., San Diego, Calif. 92106

[21] Appl. No.: 90,764

[22] Filed: Aug. 28, 1987

[51] Int. Cl.[4] .......................... G01B 7/30; G01B 7/14; G05G 9/00; G09G 1/00

[52] U.S. Cl. .................................... 324/208; 33/1 M; 74/471 XY; 324/207; 340/709; 901/2; 901/15; 901/46

[58] Field of Search ...................... 324/207, 208, 235; 73/777; 74/471 XY; 33/1 M; 200/6 A; 340/870.31, 870.32, 709, 710; 901/46

[56] References Cited

U.S. PATENT DOCUMENTS

| | | | |
|---|---|---|---|
| 3,849,724 | 11/1974 | Ghibu et al. | 324/207 |
| 4,282,484 | 8/1981 | Morrow | 324/207 |
| 4,517,514 | 5/1985 | Howell | 324/207 |
| 4,628,755 | 12/1986 | Hawley | 74/471 XY |
| 4,639,668 | 1/1987 | Petit et al. | 324/208 |

FOREIGN PATENT DOCUMENTS

| | | | |
|---|---|---|---|
| 0122424 | 7/1983 | Japan | 324/207 |
| 1069673 | 5/1967 | United Kingdom | 324/208 |

*Primary Examiner*—Gerard R. Strecker
*Attorney, Agent, or Firm*—Charmasson & Holz

[57] ABSTRACT

Two toroidal magnets are spaced apart form each other by a ferrous spherical spacer. The spacer partially engages openings provided in the two magnet surfaces facing each other. The facing magnet surfaces have the same polarity, repelling each other. The configuration creates a stable equilibrium by conduction of the magnetic flux through the spacer and the repulsive forces at the periphery of the magnets. Four "Hall Effect" sensors are mounted to one of the magnets. These sensors detect minute changes in the device's magnetic field caused by relative rotation or other movement of the magnets. A third magnet may be added for tactile sensor applications, allowing evaluation of the pressure exerted on the device.

28 Claims, 6 Drawing Sheets

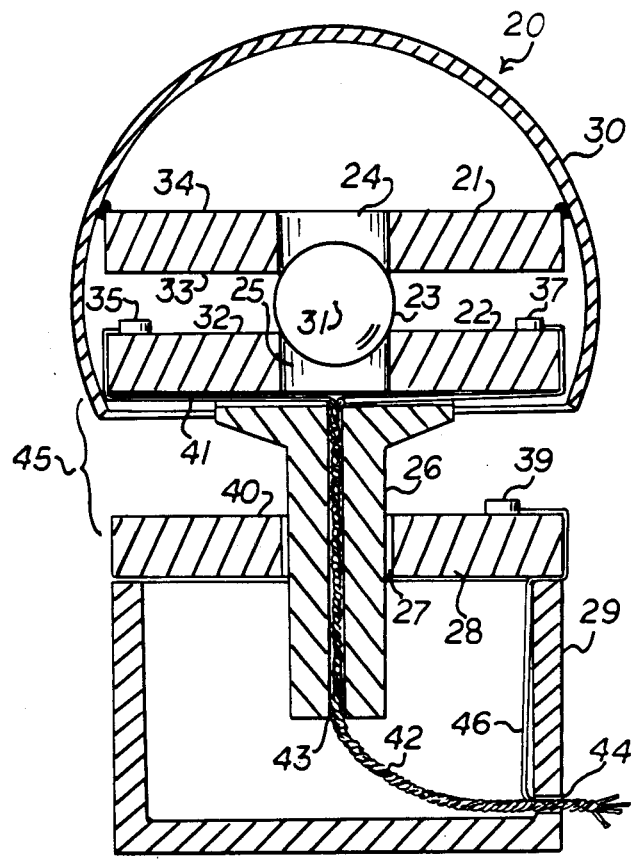
FIG. 7
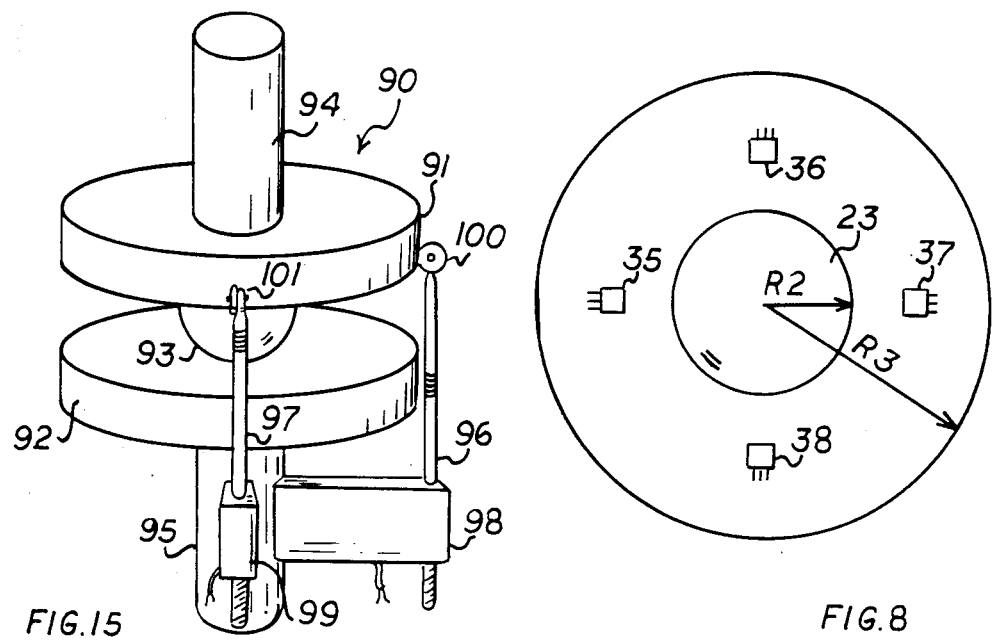
FIG. 15
FIG. 8

MAGNETIC POSITION SENSOR HAVING SPACED TOROIDAL MAGNETS IN A STATE OF EQUILIBRIUM

FIELD OF THE INVENTION

The invention relates to position sensors and more particularly to magnetic tactile sensors used in robotic manipulation and pointing devices for computer workstations.

BACKGROUND OF THE INVENTION

The need for performant tactile sensors in robotics has grown in the past ten years with the emergence of very sophisticated robots and prehension devices. Experience has shown that tactile sensors sensitive to forces exerted thereupon such as pressure forces, torque or shear forces have many pitfalls and do not perform satisfactorily in most applications.

Position sensors used as pointing devices for pointing objects on a screen of a computer are also increasingly found in the computer industry, in particular in connection with personal computers (desktop or laptop computers). The pointing devices heretofore known come in numerous forms and perform satisfactorily in most cases. Yet, they also have undesirable features inherent to the physical principles underlying their functioning.

Magnetic tactile sensors have been known to the robotics industry and are based on sensing variations of a magnetic field generated by the sensor or the object to be sensed. In particular, a shear-sensitive magnetoresistive tactile sensor has recently been disclosed in the article published in "*IEEE TRANSACTIONS ON MAGNETICS*", Vol. Mag-22, No. 5, September 1986, entitled "Shear-sensitive magnetoresistive robotic tactile sensor", by T. J. Nelson et al.

As set forth in the above-referenced article, there is disclosed a tactile sensor consisting of a small magnetized rod, constrained to pivot about its attachment to a thin elastic sheet. Magnetoresistive detectors that produce differential outputs proportional to the x and y displacements of the end of the rod are arrayed underneath the sheet. The rod can pivot about its axis in response to shear forces on the active surface. The difference in resistance of opposite pairs of detectors indicates the angular displacement and thus the shear. This arrangement seems to be performant for determining the shear components of a force but is hardly versatile as an all-function tactile sensor. In particular, the tactile sensor disclosed in the aforementioned article does not appear adequately adapted to sense pressure or torque forces.

More tactile sensors are described in an article by Leon Harmon, published in *Recent Advances in Robotics*, edited by Beni and Hackwood, 1985 P. 389–424. Because of the unusual characteristics of tactile sensing and the difficult problems encountered in the realization of robust multiple-sensors, the state of the art has developed slowly and seems primitive despite the immense progress in electronics and information processing. The concept of compliance in particular is an important component of tactile sensing. It is also essential that a tactile sensor be proprioceptive, i.e., be able to generate a feedback proportional to the force exerted by the grip of the mechanical arm or wrist.

The instantaneous kinematic and static characteristics of robotic wrist joints are also analyzed in an article entitled "Kinematic and Static Characterization of Wrist Joints and their Optimal Design", published in *IEEE, International Conference on Robotics and Automation*, P. 244–250, by H. Asada et al. It is demonstrated in this article that if wrist joints are required to rotate in all directions, the mobility ellipsoid must become a sphere. Spherical mobility is therefore considered to be optimal in isotropic kinematics.

As to pointing devices, they are now well known in the computer industry and they all serve the same purpose: pointing an object on the CRT terminal of a computer with the maximum accuracy, speed and the least fatigue by the user of the pointing device. A review of the pointing device currently used in the computer industry can be found in an article by Cary Lu, published in "*High Technology*", January 1984, pages 61 to 65, entitled "Computer pointing devices: living with mice". Very briefly summarized, the following pointing devices are presently found in the market:

cursor keys: moving the cursor via the keyboard is quite clumsy for text editing, but hopeless for graphics;

joydisks: wherein a disk can be pressed in eight directions each time activating one of a series of peripheral switches;

cursor disks: these devices consist of capacitances sensitive to the pressure of the fingers and the change of capacitance caused thereby;

touch screens: touch-sensitive screens locate the finger of the user and displace the cursor to the position indicated by that finger;

lightpens: the lightpen, which contains a light receptor, is activated by pressing it against the CRT terminal; the receptor detects the scanning beam; a timing circuit compares the beam against the scanning raster and locates the pen's position.

touch pads: they consist of two membranes coated with a resistive layer and oriented at right angles. When these membranes touch, the two-axis resistance gives the location of the cursor.

digitizer tablets: tablets are particularly suited for precision drawing and transferring existing designs. They consist of electromagnetic arrays on the surface of which a stylus or cross-hairs are removed.

mice: the two principal types are mechanically driven balls and optically sensed grids. Optical mice operate by sending square-wave trains of information to the CPU dependent on the velocity and the direction of motion. An optical mouse usually comprises a rubber-coated steel ball which contacts two capstans, each connected to an interrupter wheel. Motion along the mouse's X axis rotates one of the wheels and motion along the Y axis rotates the other wheel. Most systems use quadrature coding, a scheme that compares the output of two sensors for each axis of motion. Because of a small offset in the sensor location, the lead or lag on one sensor with respect to the other gives the direction.

trackballs: these are essentially upside-down ball-driven mice and are not adequate for precise two-dimensional positioning.

joysticks: most joysticks are mechanically coupled to a pair of potentiometers. They are widely used in computer games but are of clumsy use in business and professional software. They also exhibit variable torque requirements depending upon the direction of tilt.

All the pointing devices hereabove described have specific applications and have undesirable features such as slowness, inaccuracy or unreliability. An ergonomic study carried out by Stuart K. Card et al, published in "*Ergonomics*", 1978, vol. 21, no. 8, pages 601-613 and entitled "Evaluation of Mouse, Rate-Controlled Isometric Joystick, Step Keys, and Text Keys for Text Selection on a CRT" has shown that of the four devices tested, the mouse is clearly the superior device for text selection on a CRT. The positioning time of the mouse is fast, its error rate significantly lower and its rate of movement nearly maximal with respect to the information processing capabilities of the eye-hand guidance system.

Although mice are presently the most attractive and performant pointing devices, they require a surface that is often unavailable in crowded offices and untidy desks. They also are simply inoperative for laptop computers. Mice are also not performant for small distances, such as moving to one character at a time. Drawing with a mouse is less satisfactory than with a pencil shaped stylus.

The need has thus developed of a position sensor which measures rotations and would be used mainly in robotic and pointing device applications. Previous attempts to improve the existing devices have proven either ineffective or simply unfeasible. It has therefore drawn the attention of the inventor to design a sensor based on principles not implemented in the existing devices.

The inventor is unaware of applications utilizing the novel arrangements more fully described hereinbelow, nor applications wherein the above-described prior art has been successfully implemented.

SUMMARY OF THE INVENTION

It is therefore an object of the present invention to provide a new position sensor that provides optimal mobility and ergonomics.

Another object of the present invention is to provide an improved position sensor that is proprioceptive, compliant an robust.

It is still a further object of the present invention to provide an improved position sensor and pointing device that requires a small workspace, is omnidirectional and does not privilege any rotational direction.

A further object of the invention resides in the simplicity of the technique involved in the realization of the position sensors based thereon. In addition, the simplicity of the mechanical arrangement of the components motivates other uses of the arrangement, including remote controlled positioners.

In accordance with the present invention, a sensor consists essentially of two toroidal magnets spaced from each other by means of a spherical spacer made of ferrous material. The spherical spacer partially engages the openings provided in the two magnets. These are disposed with respect to one another such that two sides facing each other have the same polarity. This arrangement creates a stable equilibrium through the forces of attraction generated in the center of the magnets by conduction of the magnetic flux through the spacer and the forces of repulsion exerted at the periphery of those magnets. Four "Hall effect" sensors are mounted in the peripheral region of the lower magnet in each quadrant. A spherical lid in the form of a cupola is secured to the upper magnet, adjacently to the edges of the lower magnet. A third magnet is attached to a rod engaging the opening of the lower magnet and is fixed to a cylindrical support. Another sensor is mounted on the top side of the third magnet.

The displacement of the upper magnet about its rest position towards the lower magnet infers minute changes in the magnetic field that are detected by the Hall effect sensors. Adequate circuitry processes the sensor outputs and transforms any rotations of the spherical manipulator into a position vector.

For use as a tactile sensor, this vector provides all necessary information. In the application of a computer pointing device, the position vector can be used to specify either absolute or relative cursor positioning, with further processing of the position vector.

The third magnet adds a third dimension to the positioning and permits the evaluation of the pressure exerted on the cupola.

In an alternative embodiment, the magnets are replaced by two disks joined by a recoil spring surrounding the spacer. The spherical manipulator is also disclosed for use with any traditional joystick because of its improved ergonomic characteristics.

BRIEF DESCRIPTION OF THE DRAWING

For a more complete understanding of the present invention and for further advantages thereof, reference is now made to the following detailed description taken in conjunction with the accompanying drawing, wherein:

FIG. 7 is a cross-sectional view of the preferred embodiment of the present invention;

FIG. 8 is a top plan view of the intermediary magnet showing the four Hall effect sensors mounted thereon;

FIG. 15 illustrates a spherical robotic joint according to the invention.

DESCRIPTION OF THE PREFERRED EMBODIMENT OF THE INVENTION

Before describing the preferred embodiment of the present invention, it appears to be necessary to introduce the underlying physical phenomenon, in order to better understand the invention.

Figure 1:
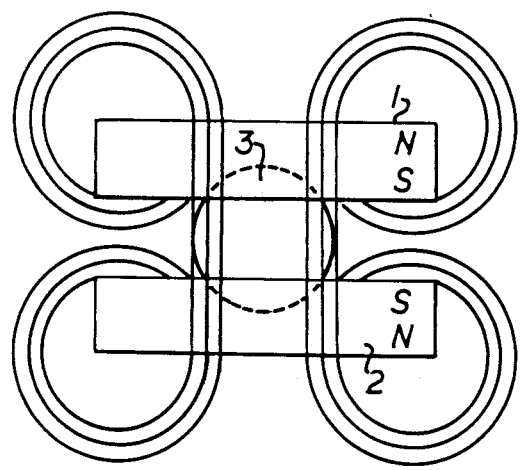
FIG. 1 is a schematic illustration of the underlying physical phenomenon implemented in the present invention.

The subjacent principle whereon the sensor of the present invention is based, is not clearly understood but can be described with reference to FIG. 1 which shows two toroidal permanent magnets 1 and 2 facing each other and spaced by a spacer 3. When the polarities of the magnets are such that two sides facing each other are the same polarity, the two magnets repel each other. The arrangement of the upper magnet 1 placed above the lower magnet 2 and coupled by a non-ferrous spacer is in a state of unstable equilibrium. This signifies that equilibrium is possible but precarious. Any motion about the rest position breaks the equilibrium.

Figure 2:
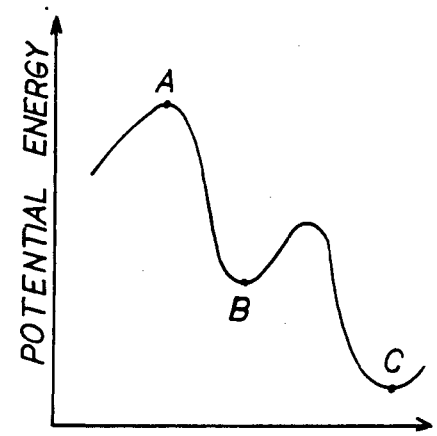
FIG. 2 is a diagram showing maxima and minima of the potential energy of the system in FIG. 1.

However, when the spacer 3 is made of ferrous material, it has been found that the equilibrium is stable. Thus, any motion about the rest position brings back the initial arrangement under the effect of a restoring force. This phenomenon can be described using the concept of potential energy, as illustrated in FIG. 2. In a state of unstable equilibrium, the potential energy is at a maximum, indicated by A in FIG. 2. Any motion around this position of equilibrium brings the potential energy to a "valley", as indicated by the letter B, which corresponds to a stable equilibrium. In the curve of FIG. 2, B is a local minimum whereas C is the absolute minimum towards which the system tends. Following the terminology, B corresponds to a quasi-stable equilibrium, whereas C indicates a stable equilibrium. The term "stable equilibrium" will hereinafter comprise the quasi-stable equilibrium.

Figure 3:
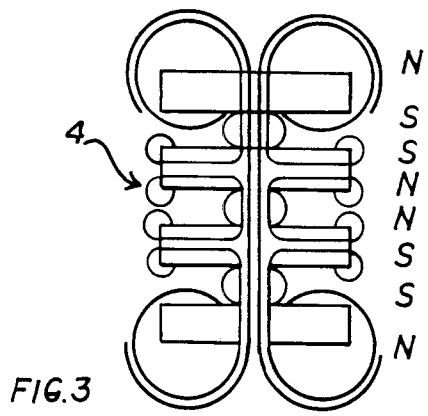
FIG. 3 illustrates a superposition of several systems of FIG. 1.

Now turning to FIG. 1 again, it is believed that the lines of flux indicated by curling lines in the figure, are conducted through the ferrous spacer 3, thereby creating forces of attraction towards the center. The peripheral forces of repulsion together with the central forces of attraction exert a couple that applies the upper toroidal magnet 1 against the lower toroidal magnet 2. The equilibrium thereby obtained is surprisingly stable. It appears that the ferrous spacer 3 acts as a flux conduit, routing the flux between the two magnets. The spacer 3 allows both the forces of attraction and repulsion to operate on the same side of the magnet. Numerous experiments have been conducted in which the size and the form of the spacer would vary. In particular, one arrangement 4 illustrated in FIG. 3 has been tested wherein a plurality of magnets are separated by spacers such as ball bearings, thereby forming a "daisy-chain" configuration. Such arrangement has also turned out to be stable.

Figure 4:
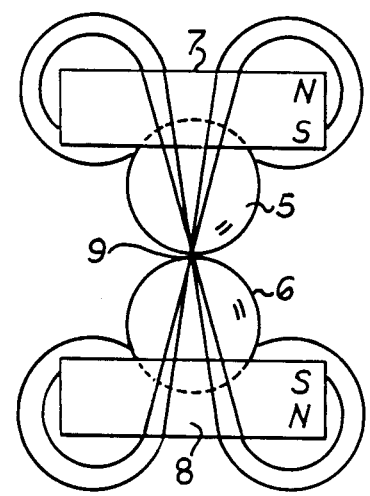
FIG. 4 depicts the system of FIG. 1 wherein the spacer has been replaced by two identical spheres.

Another configuration shown in FIG. 4 has been tested in which two superposed spherical spacers 5 and 6 separate the two magnets 7 and 8. Because the spacers 5 and 6 are almost perfectly spherical, the contact surface 9 is quasi-punctual. In this case, the magnetic flux is conducted through the two spacers via the punctual surface of contact 9. If the two spheres 5 and 6 are slightly separated, so that the point of contact 9 disappears, the flux conduction is stopped between the two magnets 7 and 8 and the equilibrium becomes unstable.

Figure 5:
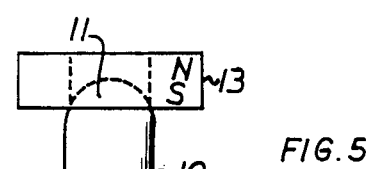
FIG. 5 shows a system with another spacer of generally cylindrical form, comprising hemispherical ends.

FIG. 5 is a pictorial representation of a system as described hereabove but wherein the spacer 10 has the form of a cylinder terminated by two hemispheres 11 and 12. The restoring couple of forces is not as great as in FIG. 1 by virtue of Gauss's law that states that magnetic forces are inversely proportional to the square of the distance between the magnetic bodies 13 and 14 creating these forces. The equilibrium thereby obtained is however, quasi-stable unless the height of the cylinder spacer 10 is so great that the gravitational forces compensate the magnetic forces and the possible intervening friction forces.

Figure 6A:
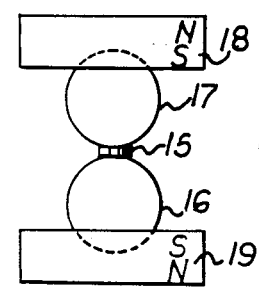
FIG. 6a represents the system of FIG. 4, wherein a steel nut has been inserted between the two spheres.
Figure 6B:
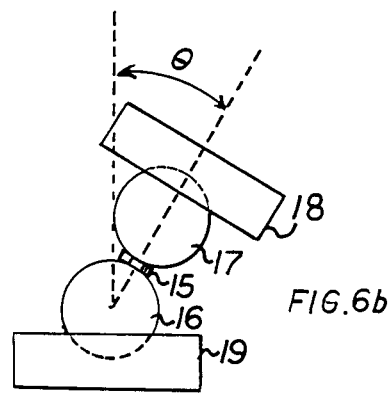
FIG. 6b illustrates the system of FIG. 6a in maximal inclination.

FIG. 6a shows a more stable configuration of the bispherical system illustrated in FIG. 4. A steel nut spacer 15 is inserted between the two spheres 16 and 17 which are separating the toroidal magnets 18 and 19, thereby providing large frictional forces that impede an early tilt of the system. In FIG. 6b, there is represented the system of FIG. 6a inclined with respect to the vertical. The angle $\theta$ is the maximum tilt that the system can undergo without falling over. The ensemble of the electromagnetic forces, the gravitational forces and the frictional forces create an equilibrium for any position of the system within the cone of angle $\theta$ as shown in FIG. 6b. Contrarily to the system of FIG. 1, the tilted device does not move back to the vertical position and remains in its tilted position. This is due to the nature of the frictional forces which vary in intensity depending on the forces applied to the system.

Although the underlying principle described in the foregoing is not clearly understood and, to the best of the applicant's knowledge, does not seem to have been a subject of study in magnetics milieu, it has been successfully implemented in the device of the present invention, as will appear hereinbelow in the specification.

Referring now to FIG. 7, there is shown a cross-section view of the preferred embodiment of the present invention. The sensor 20 of the present invention consists essentially of two toroidal magnets 21 and 22 spaced from each other by means of a spherical spacer 23 which seats against the circular openings 24 and 25 provided in the magnets 21 and 22. The two magnets 21 and 22 are typically identical and have therefore the same inner radius $R_1$, preferably 25 mm in the preferred embodiment of the present invention. The thickness of the two magnets 21 and 22 is also preferably 20 mm (FIG. 7 not drawn to scale for clarity). The spacer 23 illustrated in FIG. 7 consists of a sphere made of ferrous metal and of radius $R_2$ greater than the inner radius $R_1$ of the circular openings of the two magnets. The sphere 23 thus engages the openings 24 and 25 only partially, thereby assuring a space between the two magnets 21 and 22. This space preferably amounts to 20 mm. It should be noted that these measurements are only given for illustrative purposes.

A non-ferrous rod 26 projects downwardly from the lower magnet 22 whereto it is securely attached and slidably (in the direction shown) engages the circular opening 27 of a third toroidal magnet 28. The third magnet 28 is further secured in position by a support 29 which takes the form of a cylindrical container. The support 29 is sufficiently deep to possibly lodge the rod 26 on all its length. The support is preferably made of non-magnetic material.

A spherical lid 30 in form of a cupola is placed against the periphery of the first magnet 21 and fixedly secured in position by soldering. The lower edges of the cupola 30 slightly abut the periphery of the lower magnet 22 without being attached thereto and can therefore rotate freely about its center. The centers 31 of the spacer 23 and of the cupola 30 are coincident.

The magnets are disposed with respect to one another such that two sides 32 33 facing each other have the same polarity. The polarity of the upper side 34 of the top magnet 21 (north in the case of FIG. 7) determines the arrangement of the other magnets, namely reverse polarities for the intermediary magnet 22 and same polarity disposition as the upper magnet for the lower magnet 28. By virtue of Gauss's law, the like poles of two magnets repel each other. The three magnets 21, 22 and 28 represented in FIG. 7 are therefore mutually repelling one another.

In view of the foregoing underlying principle, the two magnets 21 and 22, along with the spherical spacer 23 and the cupola, constitute a system in a state of stable equilibrium. The spacer 23 allows the upper magnet 21 to move freely about the intermediary magnet 22 (three degrees of freedom), whereas the intermediary magnet 22 can only move vertically (one degree of freedom). The lower magnet 28 is immobile in the reference space constituted by the support 29. Any motion of one of the magnets 21 and 22 will bring the magnet to its original position under the repulsion force of the opposite magnet which the former magnet has come closer to.

Four "Hall effect" sensors 35 through 38 (36 and 38 are not visible in FIG. 7) are furthermore mounted on the periphery of the intermediary magnet 22, equidistantly such that each senor is disposed in a separate quadrant of that magnet 22. These sensors are disposed on the upper side 32, facing the upper magnet 21. Another sensor 39 is secured on the upper face 40 of the fixed magnet 28, preferably on its periphery and facing the lower side 41 of the intermediary magnet 22. A harness 42 carries the wiring to and from the various sensors 35 through 38 via a central channel 43 in the rod 26 to the container 29; then outside the container through hole 44.

FIG. 8, which is a top plan view of the magnet 22, depicts the arrangement of sensors on that magnet and clearly shows the two sensors 36 and 38 not visible in FIG. 7. The spacer 23 is also represented in FIG. 8. The sensors are mounted around a line that is substantially equidistant from the periphery of the magnet 22 and the periphery of the spacer 23. The sensors are therefore placed on a line at a distance $(R_2+R_3)/2$ of the vertical axis of symmetry of the system, $R_2$ being the radius of the spacer and $R_3$ being the outer radius of the intermediary magnet.

"Hall effect" sensors are typically used in electrical engineering for detecting small changes in a magnetic field. The sensors used in the preferred embodiment of the present invention are preferably Type UGN-3501T integrated circuits which provide a linear single-ended output, function of magnetic field intensity. These sensors are generally preferred to simple "Hall effect" switching devices which are insensitive to very small changes in a magnetic field. The four sensors 35, 36, 37 and 38, as well as the sensor 39 are electrically connected to an electrical circuit which will be described hereinbelow in more detail.

The device depicted in FIG. 7 operates in the following manner, independently of its use as a position sensor or a pointing device. The displacement of the upper magnet 21 about its horizontal rest position causes one side of the magnet 21 to come closer to the facing side of the intermediary magnet 22 whereas the other side extends away from the opposite side of the magnet 22. This motion infers minute changes in the magnetic field existing within the device, but more particularly between the upper magnet 21 and the intermediary magnet 22. These changes are detected by the sensors located on the intermediary magnets and processed in the electric circuit as will be described below. Because there is a one-to-one mapping between the change in the electromagnetic field and the position of the upper magnet with respect to the intermediary magnet 22, such change is representative of that position and can be also used as a characteristic of the direction of the movement of the upper magnet 21. The bijective mapping between the magnetic change and the position of the magnet 21 will be more fully described hereinafter.

If a force is exerted downwardly on the upper magnet, the complete assemblage 45 consisting of the two upper magnets 21 and 22, the spacer 23 and the rod 26, is pushed towards the base of the support 29. The magnetic field existing between the intermediary magnet 22 and the lower magnet 28 undergoes a change which is subsequently detected by the sensor 39 and further processed by the electrical circuitry as indicative of the force exerted on the assemblage 45. Sensors 35 through 38 may also be monitored to detect and measure the movement of assemblage 45 in lieu of sensor 39. Wiring 46 to and from sensor 39 is also carried by the lower section of harness 42 through hole 44.

Figure 9A:
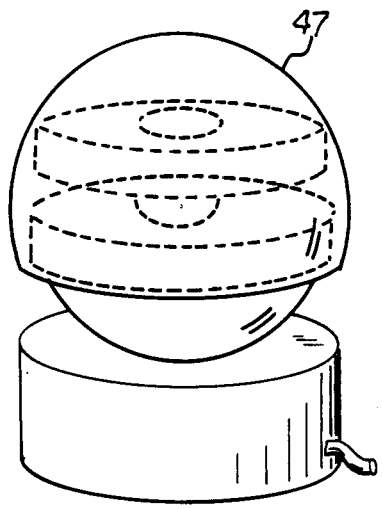
FIG. 9a is a perspective view of a second embodiment of the present invention.

FIG. 9a is a perspective view of a second embodiment of the present invention in which the rod 26 and the lower magnet 28 of the preferred embodiment have been omitted. The cross-sectional view of FIG. 9b more fully illustrates the mechanical arrangement of the spherical cupola 47, magnets 48 and 49 and spherical spacer 50.

Figure 9B:
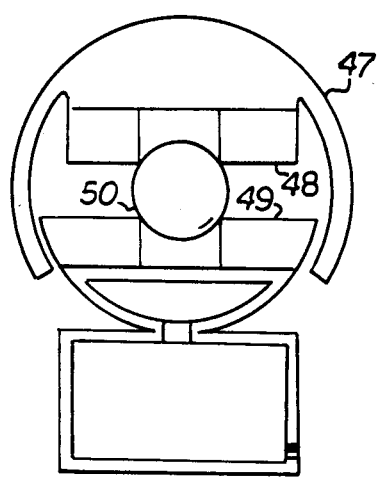
FIG. 9b is a cross-sectional view thereof.
Figure 10A:
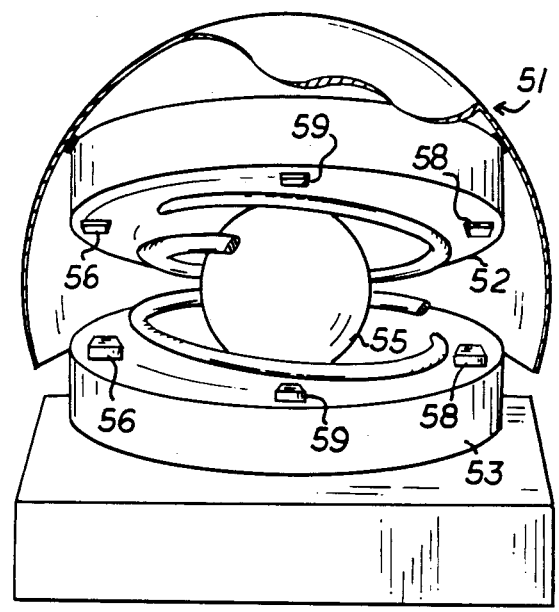
FIG. 10a is a view in perspective of a third embodiment of the present invention using a recoil spring in lieu of magnets.
Figure 10B:
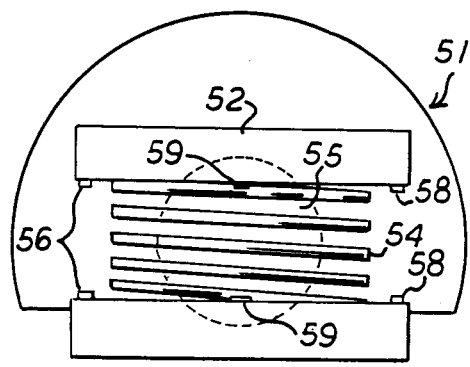
FIG. 10b is an internal front view thereof.

In a third embodiment 51 depicted in FIGS. 10a and 10b, the magnets of FIG. 9a and 9b have been replaced by two non-magnetic disks 52 and 53. A coil spring 54 attached to the disks as shown encircling the spherical spacer 55 returns the two disks to their parallel stable position just like the repelling magnetic effect of the prior embodiment. Pairs of position proximity sensors 56, 57, 58 and 59 (57 not shown) are used to detect the position of the upper disks 52 in relation to lower disk 53.

The device represented FIG. 7 and its alternative forms can be used in at least two major modes of operation, namely as a position sensor and as pointing device.

As a position sensor, the device of the present invention can be used as a tactile sensor in a mechanical arm or wrist. In this mode of operation, the sensor is connected to an output shaft. The pressure exerted by the surface contacted by the shaft is recorded via the lower sensor 39 of FIG. 7. The direction of the pressure exerting force is determined by the changes in the magnetic flux caused by the tilt of magnet 21 as detected by sensors 35 through 38.

In another alternative embodiment, electromagnets can be used in lieu of permanent magnets. Such a substitution allows the device to be remotely activated by electrical control signals.

This spherical positioner would be advantageous mainly to the field of robotics, for use in joints such as a robotic wrist as described later.

The robotic wrist thereby obtained is an improvement over prior art insofar as it presents no singularities in the middle of the workspace, that all the singular orientations lie on the boundaries of the workspace and that the workspace is relatively small. The device is furthermore of simple construction and is remarkable for its compactness.

A second mode of operation concerns the use of the sensor as a pointing device. As mentioned in the presentation of the prior art, a relative computer pointing device must specify both the direction and velocity components of a cursor displacement.

Such requirement is met in the device of the present invention, and in particular by the second embodiment shown in FIGS. 9a and 9b, as will be demonstrated hereinbelow.

Figure 11A:
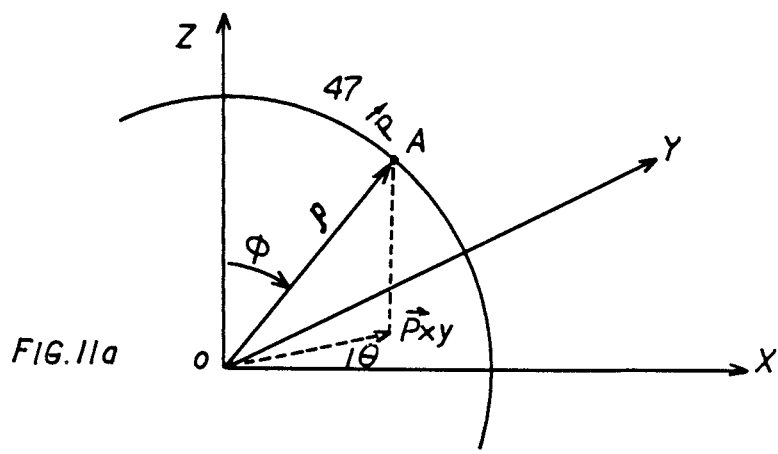
FIG. 11a is a geometrical diagram illustrating the position vectors in a spherical reference space.

FIG. 11a is a geometrical representation of the device of the present invention, in which the cupola 47 has been referenced by the axes Ox, Oy, and Oz. A point A on the cupola is determined by the vector position P, which has the following spherical coordinates: $\phi$, $\theta$ and p. The projection of P onto the x-y plane (Ox, Oy) is symbolized by the vector $P_{xy}$. The direction of the cursor's movement corresponds to the angle which is the angle between the projection of P onto the x-y plane and the x axis.

Since the distance of P from the origin is always constant, the rotation of the spherical manipulator can be reduced to a rotation vector, R, with polar coordinates ($\theta$, r) where r is linearly proportional to $\phi$ or the tilt of the spherical manipulator. Thus the rotation vector, R, specifies both the direction ($\theta$) and degree (r) of the spherical manipulator's tilt.

On the screen, the cursor is determined by its absolute position or its velocity vector V. It is indeed generally admitted that the purpose of a relative motion pointing device is not to determine where the cursor is located at a particular time, but rather how it should move to a new location.

Figures 11B, 11C:
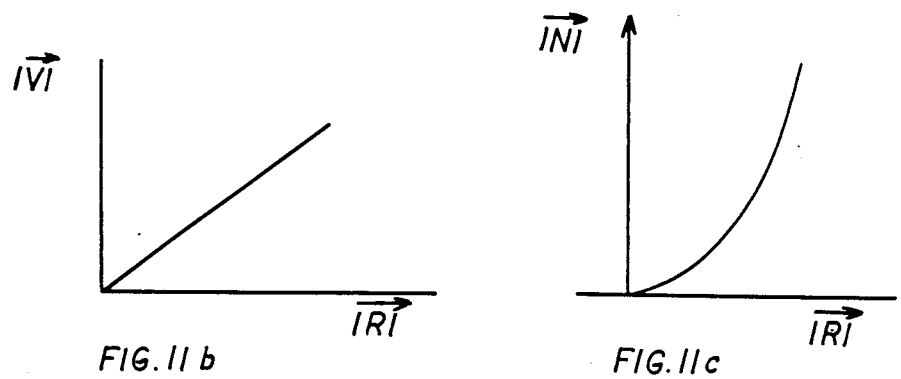
FIGS. 11b and 11c are diagrams showing the dependency between the magnitude of the velocity vector of the screen cursor and the magnitude of the projected position vector.

The pointing device must therefore be designed to transform the rotation vector R to the velocity vector V. This amounts to mapping the rotation vector R to the velocity vector V, since the device is only concerned by two-dimensional positioning. This transform can be linear as indicated in FIG. 11b. Other functions, such as an exponential transform, are not excluded. FIG. 11c shows how an exponential function can be used for mapping the position vector onto the velocity vector. In such a case, the motion of the cursor can be controlled very accurately with small tilts of the spherical manipulator and still provide extremely rapid movements with correspondingly larger tilts. An exponential transform would make the system of the present invention much faster than an pointing device currently available. It should however, be noted that there is a theoretical maximum to this category of hand-eye coordination. Therefore, only this maximum will limit the rapidity of cursor movement.

Figure 14:
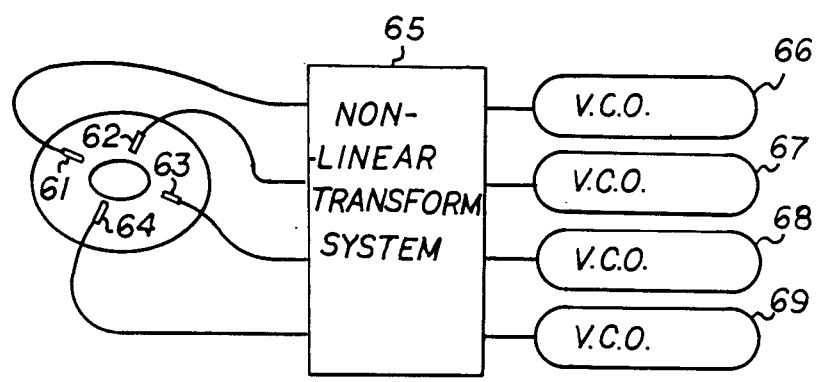
FIG. 14 is a schematic illustration of a non-linear pointer device.

FIG. 14 is a schematic illustration of the implementation of a non-linear pointer system 60 based on the second embodiment of the invention mechanically illustrated in FIGS. 9a and 9b. The outputs of the four position Hall effect sensors 61, 62, 63 and 64 are processed together through a non-linear system 65 which transforms the magnitude of the rotation vector R into the magnitude of the velocity vector V. The magnitude of vector R is obtained by computing the square root of the sum of the squares of the vector components, to which the non-linear transform is applied. The resulting outputs are then fed to four voltage to frequency converters 66, 67, 68 and 69 which provide pulse trains of square waves to a circuit 70 which converts the x and y pulse indications into signals suitable for application to a CRT in place of the signals generated by a mouse as will be further explained below.

Figure 12:
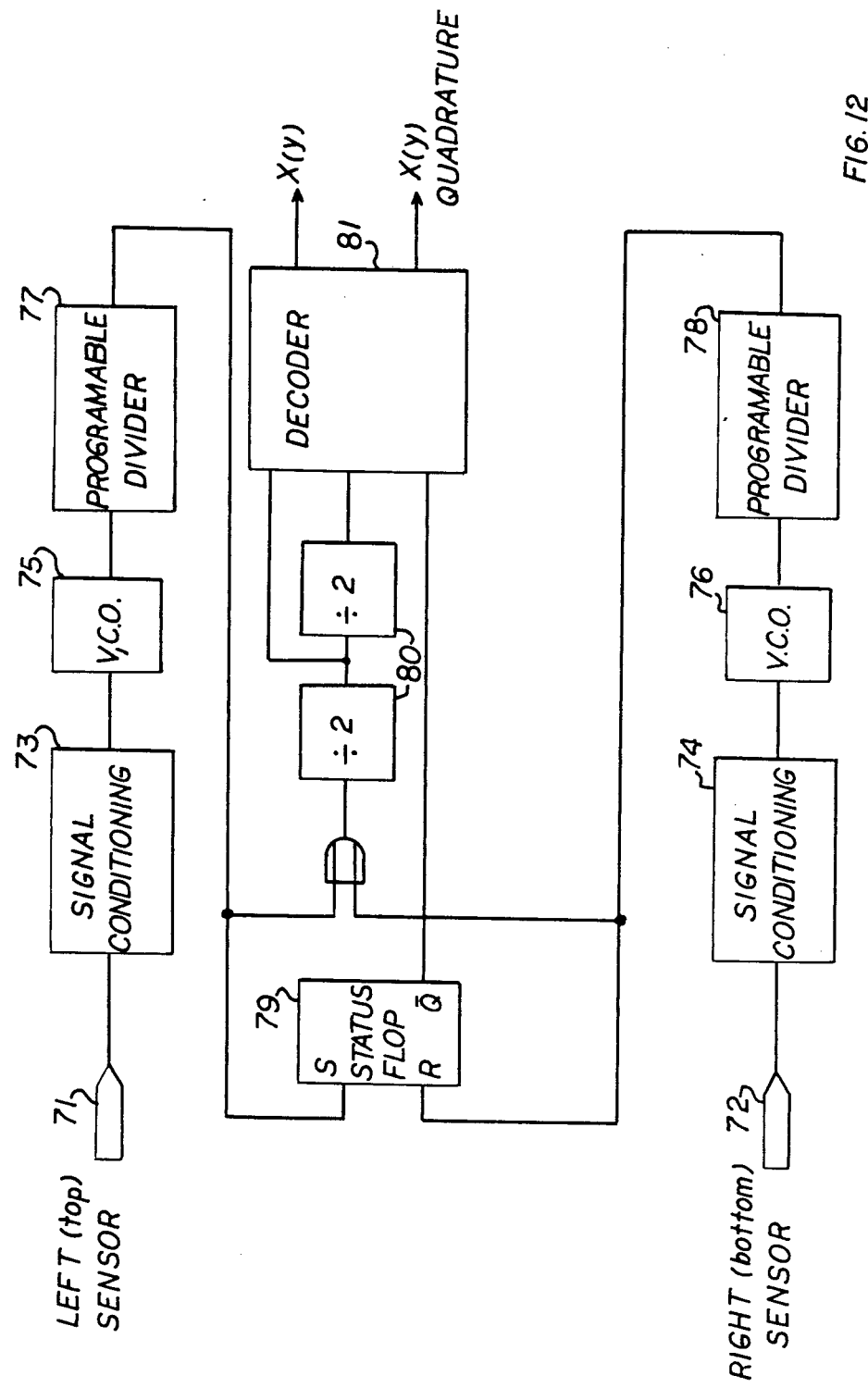
FIG. 12 shows exemplary circuitry for the second or third embodiment of the present invention used as a pointing device.

FIG. 12 shows exemplary circuitry used in the second mode of operation of the present invention with or without the improvement illustrated in FIG. 14. The sensor is used as a pointing device and is designed to be connected to any computer display, in particular to Apple or IBM brands of computer workstations. The electric implementation is very similar to the one used in the mouse systems. As indicated above, such a system uses a quadrature coding, a scheme that compares the output of two sensors for each axis of motion. Because of a small offset in the sensor location, the lead or lag on one sensor with respect to the other gives the direction.

In the system of the present invention, two VCOs (voltage controlled oscillators) at most function simultaneously. In a conventional x-y plane, the four Hall sensors are characterized as follows: positive (respectively negative) x or y sensors. Only one of the two x VCOs can be active at any given moment (rightward or leftward direction) and similarly for the y VCOs (downward or upward direction). The magnetic change due to the extending away of a magnet is negligible with respect to the magnetic change caused by the coming closer of a magnet. Therefore if the positive x sensor is activated, the magnetic change detected by the negative sensor (weakening of the magnetic flux) is unimportant. However, in an alternative embodiment, such detection of a weakening of the magnetic flux on one side corroborates the information emitted by the opposite sensor which has then detected an augmentation of the magnetic flux.

In FIG. 14, only the y-sensors (top and bottom sensors) have been represented in order to illustrate how the signal is processed from the sensor to the terminal. It is, of course, understood that the signals of the x-sensors (left and right sensors) are processed in exactly the same way.

Each linear or non-linear sensor output signal 71, 72 is first coupled to a signal conditioning device 73, 74 which offsets and amplifies the signal 71, 72. This offsetting of the signals may be used to bias the sensor so as to create a small dead-zone about the home position of the sensor in order to accommodate, i.e. filter, small involuntary movements of the operator's hand resting over the manipulator. The signal is then processed by a voltage-control oscillator 75, 76, which provides pulse trains of square waves. The output frequency is thus proportional to the amplitude of the incoming signal 71, 72. A programmable divider 77, 78 allows sensitivity adjustment. The dividers 71 and 78 for each sensor are further coupled to a direction flip-flop 79. The determination of the direction is performed similarly to the quadrature coding of the mouse device. The flip-flop 79 reflects the direction whether up or down, or left or right indicated by the tilt of the spherical manipulator. A four-state counter 80 advances four bits for every pixel progression on the screen. The decoder 81, coupled to the counter and the flip-flop 79, inverts the output of the counter according to the status of the directional flip-flop 79, and provide x, y signal and quadrature indications which mimic the output signals of a mouse.

The ratio of the x-pulses to the y-pulses determines the path of the cursor across the screen. This ratio corresponds to the direction of the velocity vector V on the screen.

As to the magnitude of the velocity vector V, it is simply a linear function of the square root of the sum of the squares of the vector components of R. As indicated above, an exponential range of velocities would provide ideal ergonomic characteristics, so that the user can gradually move from small tilts of the spherical manipulator for precision cursor positioning at very slow speeds through larger tilts providing very rapid movements of the cursor. This could be accomplished by various means, including different types or positions of the sensor, a manipulation of the signal by analog or digital methods as shown in FIG. 14.

It should be observed that the position sensor of the present invention is used as a relative pointing device. In operation, the device functions as follows. A slight tilt in any direction causes the pointer to move slowly and continuously toward the corresponding direction on the screen. A large tilt of the sphere in the same direction speeds the pointer movement.

The spherical manipulator's rotation vector could also map directly to the cursor's absolute location. Thus it could be additionally used as a absolute pointing device for cursor control.

Whether it is used as a pointing device or a sensor, the device of the present invention has the of being proprioceptive. The restoring forces provide the linear feedback of proprioception to the muscles of the hand or to the mechanical wrist. This is also partly due to the "gestalt" of the device characterized by the spherical lid.

Figure 13A:
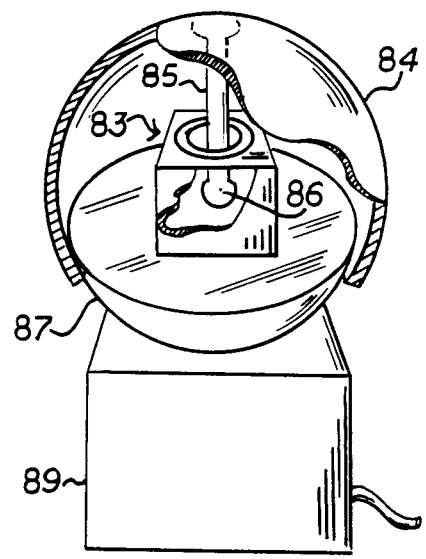
FIG. 13a is a perspective view of a fourth embodiment of the invention.
Figure 13B:
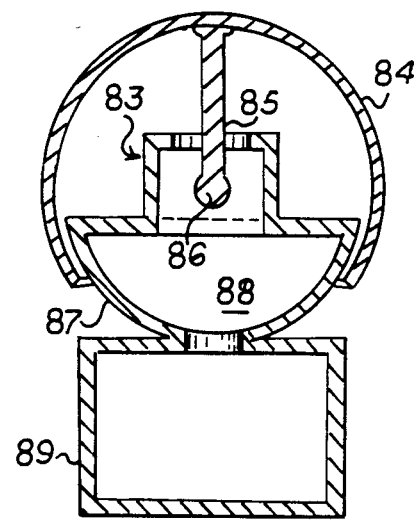
FIG. 13b is a cross-sectional view thereof.

FIGS. 13a and 13b illustrate a fourth embodiment of the present invention that is particularly adapted as a pointing device for computer terminals. The device therein represented consists simply of a traditional joystick 83 surmounted by a cupola, or spherical manipulator 84 as disclosed in the previous embodiments. The cupola 84 is securely fixed on, and supported by, the rod 85 of a conventional joystick 83 and the center 86 of the cupola corresponds to the center of rotation of the joystick. The spherical configuration offers considerable advantages over the traditional mouse or joystick. It requires less workspace than a mouse as noted hereabove and can therefore easily be integrated to a desk surface or even a keyboard. Moreover, in contrast to the joystick, the position sensor has a rotational symmetry and does not privilege any spatial direction.

The spherical manipulator is also well adapted to the shape of the human palm, allows a precise motion rate control and presents ergonomic advantages over the currently available pointing devices. It should also be noted that the construction of the spherical manipulators illustrated in FIGS. 9b and 13b uses two concentric spherical sections wherein the lower edges of the cupolas 47, 84 slide over the spherical base section composed of items 87, 88 and 89, similar to the base section shown in FIGS. 9a and 9b. This configuration provides a hermetic enclosure for the internal machinery and circuitry; thus contributing the sturdiness, safety and aesthetic appeal of the devices.

A use of the present invention in the construction of a spherical robotic joint 90 is illustrated in FIG. 15. Each toroidal magnet 91 and 92 is attached to an arm 94 or 95. The spherical spacer 93 acts as the bearing for the arm's articulation. Two lead-screws 96 and 97 respectively driven by motors 98 and 99 are used to impart movement to the upper arm 94. The motors are integrally linked to the lower arm 95 while the top ends 100 and 101 of the lead-screws are articulately linked to the outer edge of the upper magnet 91, 90° apart from one another. Other types of drives such as string-and-pulley or solenoids could be used in place of the lead screw assembly.

While the present invention has been described with respect to specific embodiments thereof and two modes of operation, it will be understood that other embodiments may be implemented in other fields and modifications may be made thereof without departing from the spirit of the invention and the scope of the appended claims.

What is claimed is:

1. A position sensor comprising:
    a first member producing a first magnetic field extending from said first member;
    a second member spaced apart from said first member and producing a second magnetic field extending from said second member to magnetically couple with said first magnetic field extending from said first member;
    a spacer capable of magnetically interacting with said first and second magnetic fields, said spacer mechanically coupling said first and second members in a flexible manner allowing free rocking and swiveling movement of one member in relation to the other about an axis passing through said members and said spacer, the assemblage of said first member, second member and said spacer creating a coupled magnetic field between said first and second members which varies as a function of the relative position of said first and second members and said assemblage being in a state of equilibrium in the absence of an external force applied to change the relative position of said first and second members and said equilibrium state; and
    at least one detector supported, positioned and oriented so as to sense small changes in the magnetic field between said first and second members caused by changes in the relative position of said first member with respect to said second member.

2. The sensor as set forth in claim 1, wherein said first and second members are positioned with respect to each other such that the sides of said members facing each other have the same magnetic polarity.

3. The sensor as set forth in claim 2, wherein the assemblage of said first member, second member and said spacer is held together solely by the combined magnetic forces developed by said magnetic members.

4. The sensor as set forth in claim 2, wherein said spacer contains ferrous material.

5. The sensor as set forth in claim 4, wherein said spacer has a substantially spherical shape.

6. The sensor as set forth in claim 5, wherein said spacer consists of a ball bearing.

7. The sensor as set forth in claim 4, wherein said detector is positioned on one of said members.

8. The sensor as set forth in claim 7, wherein said detector is placed where the changes in the magnetic field due to the relative motion of said first member with respect to said second member are the greatest.

9. The sensor as set forth in claim 4, wherein said first member has a central opening of a first radius, said second member has a generally flat top surface and said spacer is mounted on a central portion of said top surface and defines a spherical head partially engaged into said opening of said first member, said spherical head having a radius greater than said first radius.

10. The sensor as set forth in claim 9, wherein said first member comprises a first toroidal magnet.

11. The sensor as set forth in claim 10, wherein said second member comprises a second toroidal magnet having a central opening wherein said spherical spacer is partially engaged, said opening having a third radius lesser than said second radius.

12. The sensor as set forth in claim 11, wherein said second member further comprises at least two independent detectors mounted between said first and said second member, in a separate but adjacent quadrants around the central opening of one of said members.

13. The sensor as set forth in claim 4, further comprising a third member spaced apart from said second member and producing a magnetic field cooperatively extending and magnetically coupled to the magnetic field of said second member, said second member positioned by means of a part fixedly secured to said second member, said part shaped and dimensioned to allow translational movement of said third member in relation to said second member, the assemblage of said first, second, third members, said spacer and said part being in a state of equilibrium with respect to said third magnetic member.

14. The sensor as set forth in claim 13, wherein said third member comprises a third toroidal magnet having a central opening wherethrough said part is engaged.

15. The sensor as set forth in claim 14, wherein said part is a rod affixed to the central position of said second member.

16. The sensor as set forth in claim 15, wherein the side of said third member has the same polarity as the side of said second directly opposite thereto.

17. The sensor as set forth in claim 4, further comprising a non-magnetic grasping member mechanically coupled to and capping said first member.

18. The sensor as set forth in claim 17, wherein said non-magnetic member has the general shape of a sphere, said sphere surmounting said first and second members.

19. The sensor as set forth in claim 4, further comprising electrical means for processing an electrical signal generated by said detector, said signal being indicative of said magnetic changes caused by relative motion of said first member with respect to said second member.

20. The sensor as set forth in claim 19, wherein said electrical means comprise means for converting the amplitude of said electrical signal into a frequency signal.

21. The sensor as set forth in claim 20, wherein said electrical means further comprise means for comparing the frequency signals of two of said detectors in non-adjacent quadrants, the lead or the lag on the signal of one sensor with respect to the signal of the other being indicative of the direction of motion of said first member with respect to said second member.

22. The sensor as set forth in claim 1, further comprising means for coupling said sensor to the screen of a CRT comprising a mobile cursor, the motion of said cursor being directed by the motion of said first member with respect to said second member.

23. The sensor as set forth in claim 22, further comprising means for transforming the coordinates of the position vector indicative of the position of said first member with respect to said second member into the coordinates of the velocity vector of said cursor on said screen.

24. The sensor as set forth in claim 23, wherein said transforming means operate linearly.

25. The sensor as set forth in claim 23, wherein said transforming means operate non-linearly.

26. The sensor as set forth in claim 24, wherein said transforming means operate exponentially.

27. The sensor as set forth in claim 4 which further comprises:
- a third member spaced apart from said second member and producing a magnetic field, magnetically coupled to said second member; and
- a second spacer mechanically coupling said second and third members in a flexible manner allowing free rocking and swiveling movement of one coupled member in relation to the other about an axis passing through said coupled members and said spacer, the assemblage of said first member, second member, third member, and said spacers being in a state of equilibrium.

28. The sensor as set forth in claim 27 as part of a chain of similar sensors magnetically linked to one another.

* * * * *